United States Patent
Tsuchitoi

(10) Patent No.: US 9,846,777 B2
(45) Date of Patent: Dec. 19, 2017

(54) IMAGE FORMING APPARATUS THAT PERFORMS UPDATE OF FIRMWARE AND CONTROL METHOD THEREFOR

(71) Applicant: CANON KABUSHIKI KAISHA, Tokyo (JP)

(72) Inventor: Naoki Tsuchitoi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 14/556,439

(22) Filed: Dec. 1, 2014

(65) Prior Publication Data

US 2015/0154399 A1    Jun. 4, 2015

(30) Foreign Application Priority Data

Dec. 3, 2013  (JP) ................................ 2013-250096

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC ............................ G06F 21/57; G06F 2221/033
See application file for complete search history.

(56) References Cited

U.S. PATENT DOCUMENTS

| | | | | |
|---|---|---|---|---|
| 2009/0187900 A1* | 7/2009 | Nakamoto | ................ | G06F 8/65 717/168 |
| 2010/0083241 A1* | 4/2010 | Kobayashi | ............ | G06F 21/572 717/168 |
| 2011/0167419 A1* | 7/2011 | Ishikawa | ................... | G06F 8/65 717/171 |
| 2012/0206760 A1* | 8/2012 | Asahara | ............. | G03G 15/5091 358/1.15 |
| 2012/0260082 A1* | 10/2012 | Bobzin | ................. | G06F 21/572 713/100 |

FOREIGN PATENT DOCUMENTS

| | | | |
|---|---|---|---|
| JP | 2007-011944 A | 1/2007 |
| JP | 2007004377 A | 1/2007 |
| JP | 2008112297 A | 5/2008 |
| JP | 2009140432 A | 6/2009 |
| JP | 2012221197 A | 11/2012 |

OTHER PUBLICATIONS

1Dthce Action issued in Japanese Appin. No. 2013-250096 mailed Aug. 22, 2017.

* cited by examiner

*Primary Examiner* — Brandon Hoffman
*Assistant Examiner* — Nega Woldemariam
(74) *Attorney, Agent, or Firm* — Rossi, Kimms & McDowell LLP

(57) ABSTRACT

An image forming apparatus that is capable of performing an update that properly maintains a security specification configuration for an image forming apparatus with a high security specification without making an improper update. Update of firmware is controlled to be stopped when it is determined that the specification configuration of the firmware before update is a security specification configuration, and an instruction to update the firmware has been manually issued.

13 Claims, 8 Drawing Sheets

FIG. 4A

| CONTENT LIST | |
|---|---|
| FIRMWARE TYPE | VERSION |
| FIRMWARE TYPE=1 | 9.0 |

| MAIN BODY CONTROLLER | |
|---|---|
| MODULE NAME | VERSION |
| OS | 0.90 |
| OPERATING UNIT | 0.90 |
| SCAN | 0.90 |
| PRINT | 0.90 |
| NETWORK | 0.90 |
| UPDATE | 0.90 |
| PREPARATION FOR STARTUP | 0.90 |
| MAIN UPDATE | 0.90 |
| PROCESSING UNIT UPDATE | 0.90 |

| PRINTER UNIT PROGRAM | |
|---|---|
| DCOND | 0.90 |

FIG. 4B

| CONTENT LIST | |
|---|---|
| FIRMWARE TYPE | VERSION |
| FIRMWARE TYPE=1 | 9.1 |

| MAIN BODY CONTROLLER | |
|---|---|
| MODULE NAME | VERSION |
| OS | 0.90 |
| OPERATING UNIT | 0.90 |
| SCAN | 0.90 |
| PRINT | 0.91 |
| NETWORK | 0.90 |
| UPDATE | 0.90 |
| PREPARATION FOR STARTUP | 0.90 |
| MAIN UPDATE | 0.90 |
| PROCESSING UNIT UPDATE | 0.90 |

| PRINTER UNIT PROGRAM | |
|---|---|
| DCOND | 0.90 |

FIG. 4C

| CONTENT LIST | |
|---|---|
| FIRMWARE TYPE | VERSION |
| FIRMWARE TYPE=0 | 10.0 |

| MAIN BODY CONTROLLER | |
|---|---|
| MODULE NAME | VERSION |
| OS | 10.0 |
| OPERATING UNIT | 10.0 |
| SCAN | 10.0 |
| PRINT | 10.0 |
| NETWORK | 10.0 |
| UPDATE | 10.0 |
| PREPARATION FOR STARTUP | 10.0 |
| MAIN UPDATE | 10.0 |
| PROCESSING UNIT UPDATE | 10.0 |

| PRINTER UNIT PROGRAM | |
|---|---|
| DCOND | 10.0 |

FIG. 4D

| CONTENT LIST | |
|---|---|
| FIRMWARE TYPE | VERSION |
| FIRMWARE TYPE=0 | 10.1 |

| MAIN BODY CONTROLLER | |
|---|---|
| MODULE NAME | VERSION |
| OS | 10.0 |
| OPERATING UNIT | 10.0 |
| SCAN | 10.0 |
| PRINT | 10.1 |
| NETWORK | 10.0 |
| UPDATE | 10.0 |
| PREPARATION FOR STARTUP | 10.0 |
| MAIN UPDATE | 10.0 |
| PROCESSING UNIT UPDATE | 10.0 |

| PRINTER UNIT PROGRAM | |
|---|---|
| DCOND | 10.0 |

IMAGE FORMING APPARATUS THAT PERFORMS UPDATE OF FIRMWARE AND CONTROL METHOD THEREFOR

BACKGROUND OF THE INVENTION

Field of the Invention

The present invention relates to an image forming apparatus and a control method therefor, and in particular to an image forming apparatus that limits update according to specifications of firmware to be updated and a control method therefor.

Description of the Related Art

In recent years, image forming apparatuses have come to be capable of not only merely printing and sending images but also offering file service functions to personal computers (PCs) on a network by connecting to the network. Some image forming apparatuses have the same functions as those of servers placed on a network.

In computer equipment such as PCs and servers, software using a server on a network or a storage medium such as a USB memory is generally updated so as to cope with vulnerability in terms of security or correct a malfunction. In image forming apparatuses as well, it has become common to update firmware as with computer equipment.

As for firmware update, a danger of modified firmware, which is not authorized firmware offered by a vendor, being introduced has been pointed out. An image forming apparatus placed in an office or the like is usually connected to a network connected to the Internet, and this may cause leakage of confidential information or unauthorized operation. For this reason, there is an increasing demand to make sure that update is properly performed. For example, there has been proposed a method to prevent tempering or unauthorized version update by encrypting a firmware program when downloading firmware via a network (see Japanese Laid-Open Patent Publication (Kokai) No. 2007-11944).

Image forming apparatuses are not able to provide control to switch ways for updating firmware or to prohibit update of firmware according to security specification compliant state or configuration types of firmware. The security specification compliant state here means a state in which security specifications are enhanced or some functions are limited so as to improve security as compared to general specifications. The configuration types of firmware include a general specification configuration that is usually introduced when an image forming apparatus is shipped, and a security specification configuration described hereafter.

As image forming apparatuses of the same model, different types consisting of those having more strict security specifications and those having general specifications are used depending on user's introducing guidelines. The security specification configuration means a configuration intended to comprehensively enhance security functions such as authentication, data encryption, and input-output management and thus prevent unauthorized access to and manipulations on a network system, data tampering, and information leakage by third parties.

For example, there are firmware versions evaluated and authenticated by public certification authorities according to security evaluation methods defined by IEEE standards and firmware designed for particular customers who require high security. When the need to update firmware arises, update firmware is prepared for each type of security specification configurations.

However, when a device with a high security specification configuration is updated by mistake with firmware with a general specification configuration, the security specification complying state of the device changes, and the security specification configuration that should be insured cannot be maintained.

SUMMARY OF THE INVENTION

The present invention provides an image forming apparatus that is capable of performing an update that properly maintains a security specification configuration for an image forming apparatus with a high security specification without making an improper update and a control method therefor.

Accordingly, a first aspect of the present invention provides an image forming apparatus comprising a receiving unit configured to receive an instruction for performing update of firmware, an obtaining unit configured to obtain update firmware from an external apparatus based on the instruction, and a control unit configured to determine whether firmware applied to the image forming apparatus is security firmware, and determine whether the obtained update firmware is the security firmware, wherein the control unit decides that the update is enabled or disabled based on a result of determination.

Accordingly, a second aspect of the present invention provides an image forming apparatus comprising a receiving unit configured to receive an instruction for performing update of firmware, an obtaining unit configured to obtain update firmware from an external apparatus based on the instruction, a control unit configured to determine whether firmware applied to the image forming apparatus is security firmware, and determine whether the obtained update firmware is the security firmware, and a warning unit configured to provide a warning regarding the update based on a result of determination by the control unit.

Accordingly, a third aspect of the present invention provides a method for controlling an image forming apparatus, comprising a receiving step of receiving an instruction for performing update of firmware, an obtaining step of obtaining update firmware from an external apparatus based on the instruction, and a control step of determining whether firmware applied to the image forming apparatus is security firmware, and determining whether the obtained update firmware is the security firmware, wherein in the control step, it is decided that the update is enabled or disabled based on a result of determination.

Accordingly, a fourth aspect of the present invention provides a control method for an image forming apparatus, comprising a receiving step of receiving an instruction for performing update of firmware, an obtaining step of obtaining update firmware from an external apparatus based on the instruction, a control step of determining whether firmware applied to the image forming apparatus is security firmware, and determining whether the obtained update firmware is the security firmware, and a warning step of providing a warning regarding the update based on a result of determination in the control step.

According to the present invention, based upon a firmware configuration state of the image forming apparatus or a type of update firmware, whether or not suitable firmware is prepared is determined to thus limit an updating method. As a result, an update that properly maintains a security specification configuration is performed for an image forming apparatus with a high security specification without making an improper update.

Further features of the present invention will become apparent from the following description of exemplary embodiments (with reference to the attached drawings).

BRIEF DESCRIPTION OF THE DRAWINGS

FIGS. 4A to 4D are views showing exemplary content lists showing lists of various programs of firmware, the content lists in FIGS. 4A to 4D differing in identification values of firmware types and versions.

DESCRIPTION OF THE EMBODIMENTS

The present invention will now be described in detail with reference to the drawings showing embodiments thereof.

Figure 1:
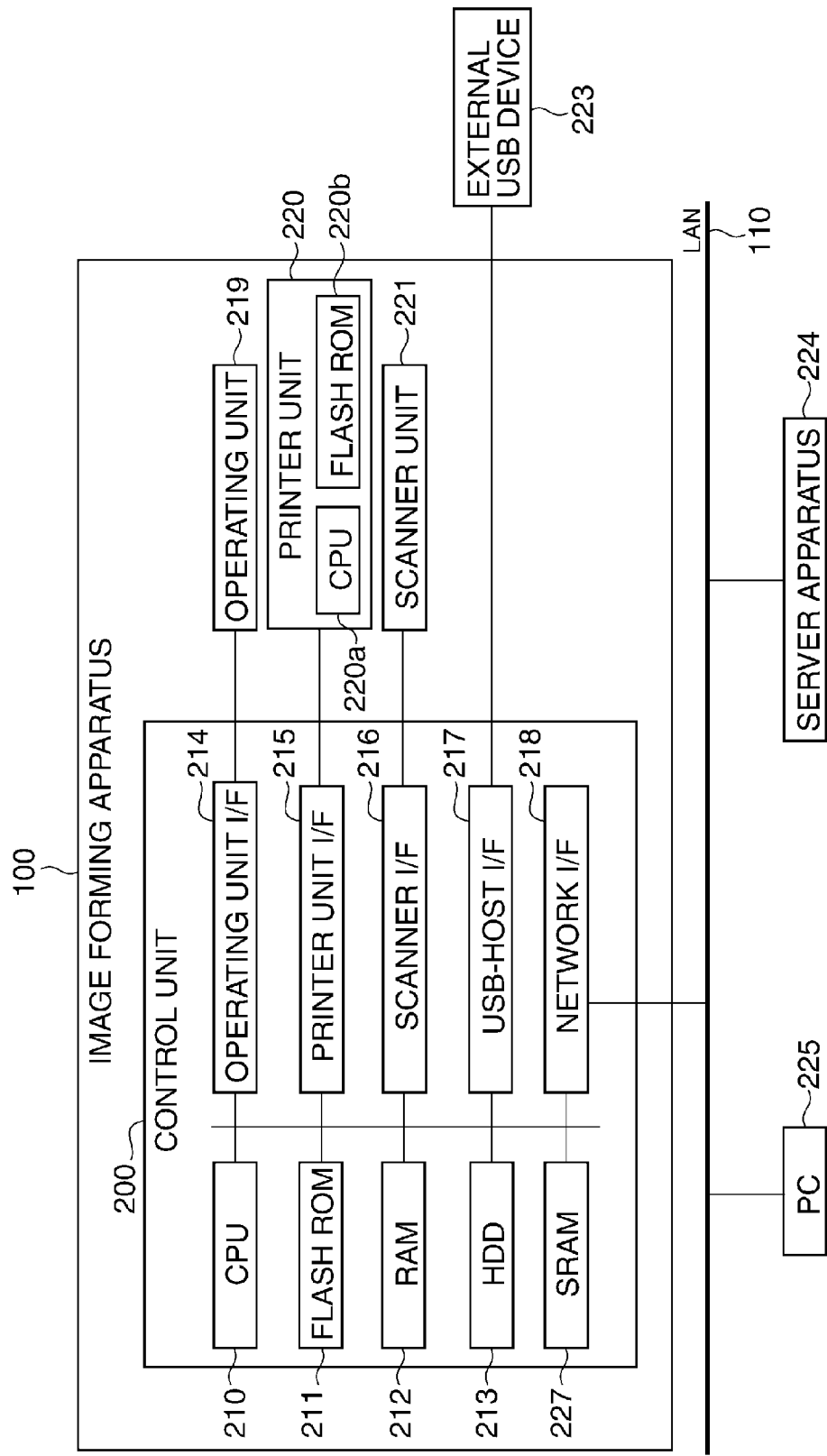
FIG. 1 is a block diagram schematically showing an arrangement of an image forming apparatus according to a first embodiment of the present invention.

FIG. 1 is a block diagram schematically showing an arrangement of an image forming apparatus according to a first embodiment of the present invention.

Referring to FIG. 1, the image forming apparatus 100 is comprised of a control unit 200, an operating unit 219, a printer unit 220, and a scanner unit 221.

The control unit 200 has a CPU 210, a flash ROM 211, a RAM 212, an HDD 213, an operating unit I/F 214, a printer I/F 215, a scanner I/F 216, a USB-Host I/F 217, a network I/F 218, and an SRAM 227.

The CPU 210 carries out various control processes such as reading control, printing control, and firmware update control by loading programs (firmware) stored in the flash ROM 211 into the RAM 212. License information, device configuration information, firmware version information, and so on are stored in the flash ROM 211.

The RAM 212 is a memory that is used as a temporary storage area such as a main memory or a work area for the CPU 210. The hard disk drive (HDD) 213 is a memory that stores image data, user data, and so on. The HDD 213 also stores print data received from a PC 225 connected to a LAN via the network I/F (interface) 218. It should be noted that the HDD 213 may be an SSD (solid state drive). The control unit 200 may be configured to have a plurality of CPUs.

The operating unit I/F 214 is an interface (I/F) that transmits instructions input by a user of the image forming apparatus 100 via the operating unit 219 to the CPU 210. The operating unit I/f 214 also receives instructions for switching displays on the operating units 219 from the CPU 210 and transmits the instructions to the operating unit 219. The operating unit 219, which is equipped with a liquid crystal display having a touch panel function, a keyboard, and so on, not shown, receives instructions from the user.

The printer I/F 215 is an I/F that connects the control unit 200 and the printer unit 220 to each other. The printer unit 220 performs printing on sheets based on image data transferred from the HDD 213 via the printer I/F 215.

The printer unit 220 has a CPU 220a and a flash ROM 220b. By executing programs stored in the flash ROM 220b, the CPU 220a causes the printer unit 220 to perform various operations involved in print processing.

The scanner I/F 216 is an I/F that connects the control unit 200 and the scanner unit 221 to each other. The scanner unit 221 has such a functional configuration as to read an image off an original as image data using a line sensor (not shown) comprised of a CCD (charge-coupled device) or the like. The scanner unit 221 then transfers the read image data to the HDD 213 via the scanner I/F 216. The image data transferred to and stored in the HDD 213 is allowed to be printed by the printer unit 220, and copying is enabled by the printer unit 220 printing the image data read by the scanner unit 221.

The programs that are executed by the CPU 210 include an application program for printing. In accordance with this application program for printing, print data stored in the HDD 213 is converted into image data printable by the printer unit 220, and the image data obtained as a result of the conversion is transferred to and stored in the HDD 213 again.

The programs that are executed by the CPU 210 also include an application program for scanning. In accordance with this application program for scanning, image data is read by the scanner 221, and the read image data is transferred to and stored in the HDD 213.

The USB-Host I/F 217 is an I/F that connects the control unit 200 and an external USB device 223 to each other. Examples of the external USB device 223 include a USB memory and a USB keyboard. When a USB memory is connected as the external USB device 223, a program required for update (update file) can be transferred from this USB memory to a file storage area of the flash ROM 211.

The network I/F 218 is an I/F that connects the control unit 200 and a LAN 110 to each other and carries out communications with the PC 225 and a server apparatus 224 on the LAN 110.

The server apparatus 224 stores update information for updating various programs (those which are executed by the image forming apparatus 100), to be described later, and in response to a request from the image forming apparatus 100, sends the update information to the image forming apparatus 100.

The SRAM 227 is a memory that stores update conditions of programs in a main partition and a sub partition, to be described later, and information on configuration management, status, settings, and so on of the image forming apparatus 100. It should be noted that information on configuration management, status, settings, and so on of the image forming apparatus 100 may be stored in the HDD 213.

Figure 2:
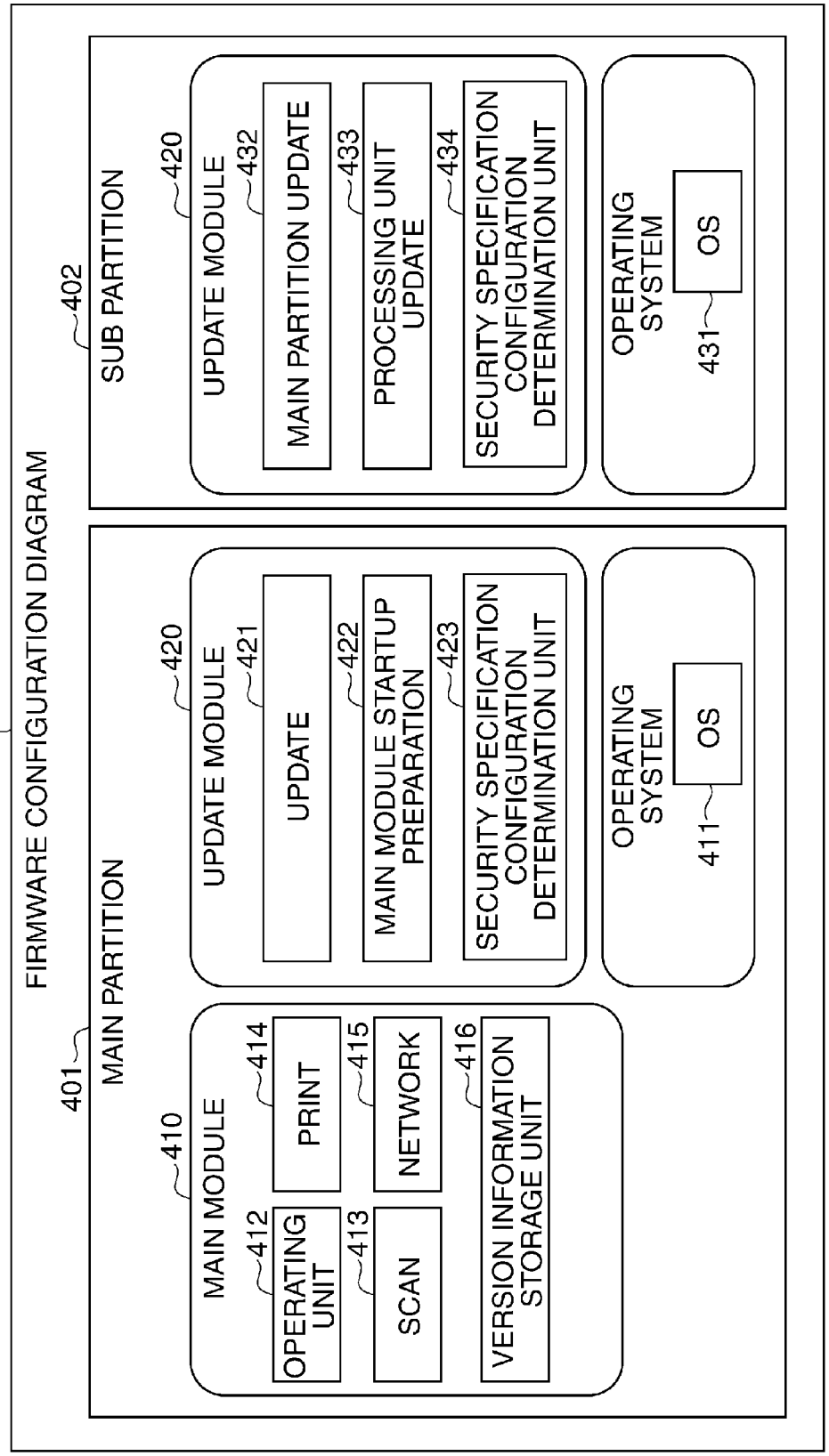
FIG. 2 is a diagram schematically showing an arrangement of programs that are executed by a CPU of a control unit.

Referring next to FIG. 2, a description will be given of an arrangement of programs that are executed by the CPU 210 of the control unit 200.

FIG. 2 is a diagram schematically showing an arrangement of programs that are executed by the CPU 210 of the control unit 200. It should be noted that the programs in FIG. 2 are stored in the flash ROM 211 and loaded into the RAM 212 when they run.

The programs stored in the flash ROM 211 are stored separately in two partitions on the flash ROM 211. One is a main partition 401, and the other is a sub partition 402. When the image forming apparatus 100 is to perform normal operations, the CPU 210 is caused to execute an operating system program (hereafter referred to as an "OS") 411 stored in the main partition 401. On the other hand, when programs for causing the image forming apparatus 100 to perform normal operations (programs stored in the main partition 401) are to be updated, the CPU 210 is caused to execute an OS 431 stored in the sub partition 402.

The main partition 401 includes three program modules consisting of a main module 410, the OS 411, and an update module 420.

The OS 411, which is for controlling the image forming apparatus 100, includes driver programs for controlling operation of various components of the image forming apparatus 100.

The sub partition 402 includes two program modules consisting of the OS 431 and an update module 430.

The OS 431, which is an OS for controlling the image forming apparatus 100, is the same as the OS 411 described above.

A description will now be given of program modules included in the main module 410 in the main partition 401. It should be noted that these program modules are application programs that are executed by the OS 411 when the OS 411 is started.

An operating unit program 412 is for transmitting instructions input by an operator of the image forming apparatus 100 via the operating unit 219 to the CPU 210 and carrying out processes according to the transmitted instructions.

A scan program 413 is for controlling a scanning process that is carried out by the scanner unit 221. A print program 414 is for controlling a printing process that is carried out by the printer unit 220.

A network program 415 is for carrying out communications with the PC 225 and the server apparatus 224 on the LAN 110.

A version information storage unit 416 stores a firmware version of the main module 410 of the image forming apparatus 100. Version information on firmware is allowed to be read from the flash Rom 211 and seen on the operating unit 219.

The update module 420 includes an update program 421, a main module starting preparation program 422, and a security specification configuration determination unit 423.

The update program 421 is for updating programs included in the main partition 401 and programs included in the sub partition 402.

The main module starting preparation program 422 is for carrying out an initialization process required for the CPU 210 to execute the main module 410.

The security specification configuration determination unit 423 determines whether or not firmware of the image forming apparatus 100 has a special security specification configuration at the time of update, or whether or not the version of update firmware matches the specification configuration of the image forming apparatus 100. The security specification configuration determination unit 423 reads version information from the version information storage unit 416 and compares it with the device configuration management status and settings in the SRAM 227 to make the above determination. The firmware having the special security specification configuration includes, for example, firmware versions evaluated and authenticated by public certification authorities according to security evaluation methods defined by IEEE standards and firmware designed for particular customers who require high security.

A description will now be given of program modules included in the update module 430 in the sub partition 402. It should be noted that these program modules are application programs that are executed by the OS 431 after the OS 431 is started.

A main partition update program 432 is for updating programs included in the main partition 401.

A processing unit update program 433 is a program for updating a processing unit program (here, a program for carrying out a printing process included in the flash ROM 220b).

A security specification configuration determination unit 434 has the same function as that of the security specification configuration determination unit 423 in the main partition 401.

It should be noted that the module groups described above may be comprised of module groups different from those in the present embodiment.

Figure 3:
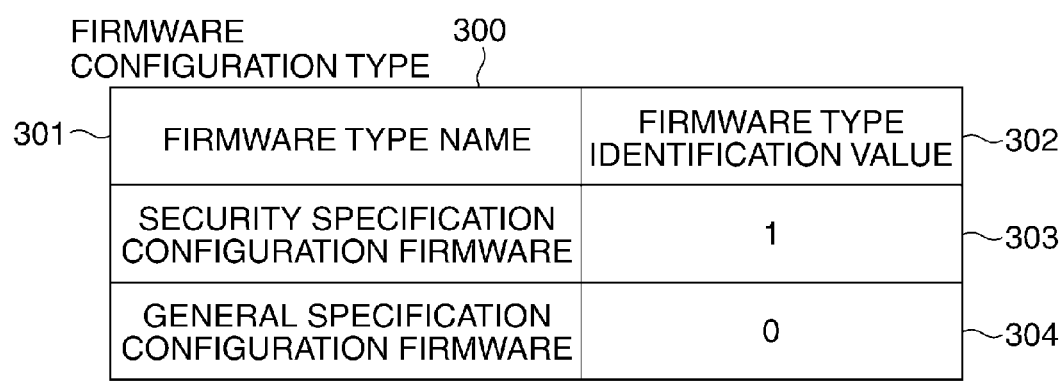
FIG. 3 is a diagram showing exemplary configuration types of firmware according to the first embodiment.
Figure 5:
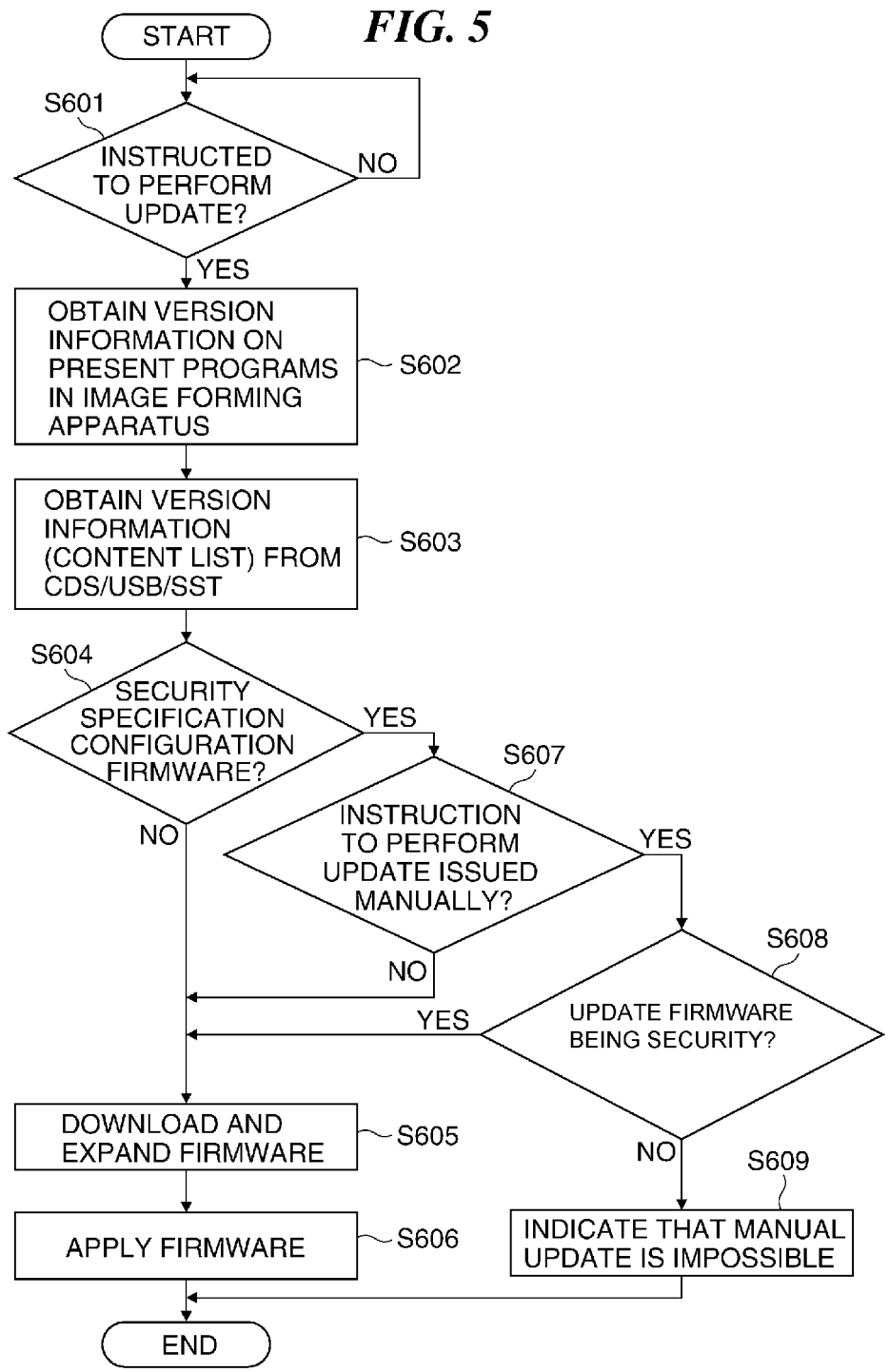
FIG. 5 is a flowchart showing the flow of a process to update firmware according to the first embodiment of the present invention.

Referring next to FIGS. 3 to 5, a description will be given of how firmware is updated according to the first embodiment.

There are two patterns explained hereafter as methods to update firmware in the image forming apparatus 100.

One is a first firmware update method in which update firmware (update file) is downloaded from the external USB device 223, the PC 225, or the server apparatus 224 through operation by an administrator or a serviceperson via the operating unit 219 into the HDD 213.

In this case, the downloaded update file is applied to a program by the update program 421 of the update module 420 immediately after the downloaded update file is temporarily expanded. This first firmware update method is a basic update method, but according to this method, firmware with a wrong security specification configuration may be introduced due to an operation mistake made by an administrator or a serviceperson who is an operator.

The other one is a second firmware update method in which the image forming apparatus 100 makes inquiries to the server apparatus 224, which manages firmware, at regular time intervals to ascertain whether or not there is latest firmware for the security specification configuration of the image forming apparatus 100, and when there is latest firmware, an update file is downloaded from the server apparatus 224 into the HDD 213.

In this case, the downloaded update file is applied to a program by the update program 421 of the update module 420 immediately after the downloaded update file is temporarily expanded. According to this second firmware updating method, the present security specification configuration of the image forming apparatus 100 is checked, and only version updates that can maintain the same security specification configuration are allowed. For this reason, the problem that firmware with a wrong security specification configuration is introduced due to an operation mistake made by an administrator or a serviceperson who is an operator never arises.

In a case where firmware in the image forming apparatus 100 has a stricter security specification configuration, when an improper update is performed using the first update method, the strict security specification configuration may become loose. Accordingly, in the present embodiment, update firmware for security specifications and configurations is reliably applied to the image forming apparatus 100 constructed with a security specification configuration.

FIG. 3 is a diagram showing exemplary configuration types of firmware according to the first embodiment.

Firmware configuration types 300 are comprised of firmware type names 301 and firmware type identification values 302 and stored in the version information storage unit 416 provided in the flash ROM 211. As the firmware type names 301, security specification configuration firmware and normal specification configuration firmware are set. The firmware type identification values 302 are also included in content lists to be described later with reference to FIGS. 4A to 4D. By referring to the firmware type identification values 302, the security specification configuration determination units 423 and 434 limit update processing methods when updating firmware.

It should be noted that the firmware configuration types shown in the figure may be different from the present embodiment and should not always be stored in the flash ROM 211 but may be stored in a difference place of the image forming apparatus 100, such as the HDD 213 or the SRAM 227.

Referring next to FIGS. 4A to 4D, a description will be given of content lists which are lists of programs to be updated and update data required for update in the image forming apparatus 100.

The content list in FIG. 4A is a content list of firmware for which the firmware type identification value 302 is 1, that is, the firmware type name 301 is security specification configuration firmware, and the version of the firmware is 9.0.

The content list in FIG. 4B is a content list of security specification configuration firmware for which the firmware type identification value 302 is 1, but the version of the firmware is 9.1. The content list in FIG. 4B is a content list of firmware which are update firmware for firmware corresponding to the content list in FIG. 4A. When the content list in FIG. 4A and the content list in FIG. 4B are compared with each other, it is found that the version of the print module is updated from 0.90 to 0.91.

The content list in FIG. 4C is a content list of firmware for which the firmware type identification value 302 is 0, that is, the firmware type name 301 is general specification configuration firmware, and the version of the firmware is 10.0.

The content list in FIG. 4D is a content list of general specification configuration firmware contents for which the firmware type identification value 302 is 0, but the version of the firmware is 10.1. The content list in FIG. 4D is a content list of firmware which are updating firmware for firmware corresponding to the content list in FIG. 4C. When the content list in FIG. 4C and the content list in FIG. 4D are compared with each other, it is found that the version of the print module is updated from 10.0 to 10.1.

The content lists shown in FIGS. 4A to 4D show versions of programs in the control unit 200 and versions of programs in the printer unit, and they show version configurations of contents themselves. For this reason, even in a case where the print module is the same, if update firmware for a general specification configuration is applied to firmware with a security specification configuration, the security specification configuration will be changed, and the status of the security specification configuration of the image forming apparatus 100 cannot be maintained. To reliably maintain the security condition of the image forming apparatus 100, update firmware is required to be applied with respect to each firmware type.

FIG. 5 is a flowchart showing the flow of a firmware update process according to the first embodiment of the present invention. It should be noted that this process is implemented by the CPU 210 of the control unit 200 executing a program stored in the flash ROM 211. In the following description, "expansion" of a program means temporary writing of a set of downloaded program files into some other area, and "applying" means writing of a program into an actual program area.

In step S601, the CPU 210 determines whether or not an instruction to perform update for updating a program (firmware) in the image forming apparatus 100 has been issued, and when it is determined that the instruction has been issued (YES in the step S601), the process proceeds to step S602. Here, the instruction to perform update means, for example, an instruction issued by an operator of the image forming apparatus 100 via the operating unit 219 or an update instruction automatically issued by the update module 420. When it is determined in the step S601 that the instruction has not been issued (NO in the step S601), the process returns to the step S601, in which the CPU 210 waits for an instruction to perform update.

In the step S602, by executing the update program 421 via the OS 411, the CPU 210 obtains version information on programs of firmware stored in the flash ROM 211 or the flash ROM 220b. Version information on programs of firmware before update is obtained from such a content list as shown in FIG. 4A. According to the content list in FIG. 4A, the configuration type is security specification configuration, and the version is 9.0.

In step S603, the CPU 210 obtains version information on programs of update firmware from the external USB device 223, the PC 225, or the server apparatus 224 in accordance with an instruction given by the operator via the operating unit 219. Version information on programs of update firmware is obtained from such a content list as shown in FIG. 4B. According to the content list in FIG. 4B, the configuration type is security specification configuration, and the version is 9.1.

In step S604, by means of the security specification configuration determination unit 423, the CPU 210 determines whether or not the specification configuration of firmware before update obtained in the step S602 is a security specification configuration firmware. When the CPU 210 determines that the firmware before update is not security specification configuration firmware (NO in the step S604), the process proceeds to step S605, and on the other hand, when the CPU 210 determines that the firmware before update is security specification configuration firmware (YES in the step S604), the process proceeds to step S607.

In the step S607, the CPU 210 determines whether or not the instruction to perform update has been manually issued is determined, and when the CPU 210 determines that the instruction has not been manually issued (NO in the step S607), the process proceeds to the step S605. On the other hand, when the CPU 210 determines that the instruction has been manually issued (YES in the step S607), the process branches to step S608. Here, the instruction that is manually issued includes an instruction to update firmware via a network using firmware update software called a service support tool (hereafter referred to as "the SST") introduced into a device such as a laptop computer by a serviceperson. The instruction that is manually issued also includes an instruction to update firmware by storing firmware in a portable storage medium such as a USB memory in advance and uploading it to the image forming apparatus 100 through a serviceperson's operation.

In the step S608, the CPU 210 determines whether or not the specification configuration of the update firmware is security specification configuration firmware, and when the CPU 210 determines that the update firmware is security specification configuration firmware (YES in the step S608), the process branches to the step S605. On the other hand, when not (NO in the step S608), the process proceeds to step S609.

Then, the CPU 210 downloads and expands the update firmware (step S605) and applies the update firmware (step S606), followed by terminating the present process.

In the step S609, the CPU 210 notifies the operator via the operating unit 219 that manual update is impossible (update stopped) and terminates the present process.

According to the present embodiment, when security specification configuration firmware is being used (YES in the step S604), how an instruction to perform update has been issued is checked so as to avoid the risk of changing to general specification configuration firmware (step S607). Then, when the instruction to perform update has been manually issued, which may cause a malfunction, firmware is not updated, and only when the instruction to perform update has been automatically issued, update is enabled. As a result, an improper update is not performed for an image forming apparatus with a high security specification, and an update that properly maintains the security specification configuration can be performed.

Although in the embodiment described above, in the step S609 in the flowchart of FIG. 5, the operator is notified that update of firmware is impossible, and update is stopped, the present invention is not limited to this, but for example, a process described hereafter may be carried out.

Namely, in the step S609, the CPU 210 may display a warning screen (not shown) on the operating unit 219. Then, on the warning screen, a user, an administrator, or a serviceperson may be prompted to determine whether or not to continue or discontinue update of firmware, and when continuation is selected, the process proceeds to the step S605, and when discontinuation is selected, the process proceeds to the step S609.

Moreover, although according to the flowchart of FIG. 5, whether an instruction to perform update has been manually or automatically issued is determined in the step S607, and based on a result of the determination, update is selectively enabled or disabled, the present invention is not limited to this, but for example, a process described hereafter may be carried out.

Namely, the process in the step S607 may be dispensed with, and when it is determined that the specification configuration of firmware before update is a security specification configuration (YES in the step S604), and it is determined that the specification configuration of update firmware is not a security specification configuration (NO in the step S608), the process in the step S609 may be carried out irrespective of whether an instruction to perform update has been manually or automatically issued.

Moreover, although according to the flowchart of FIG. 5, it is determined whether or not the specification configuration of firmware before update or update firmware is a security specification configuration, the present invention is not limited to this, but for example, a determination process described hereafter may be carried out.

Namely, it may be determined whether or not firmware before update or update firmware is, for example, firmware with a special specification configuration intended for particular customers (such as firmware that supports business meetings). For example, whether or not firmware before update or update firmware is firmware that supports business meetings is determined by the CPU 210 based on a firmware type written in the content list of firmware in FIG. 4 or a firmware type stored in the version information storage unit 416 set in the flash ROM 211.

Moreover, according to the flowchart of FIG. 5, when it is determined that the specification configuration of firmware before update is a security specification configuration (YES in the step S604), and it is determined that the specification configuration of update firmware is not a security specification configuration (NO in the step S608), the process in the step S609 is carried out.

The present invention, however, is not limited to this, but for example, a determination process described hereafter may be carried out. Namely, instead of the CPU 210 performing the steps S604 and the step S608, it may be determined whether or not the specification configuration of firmware before update and the specification configuration of update firmware are the same. In this case, the specification configurations are compared as described hereafter.

Namely, a firmware type stored in the version information storage unit 416 set in the flash ROM 211 and a firmware type written in the content list of downloaded update firmware (FIG. 4) are compared with each other, and when they match, it is determined that the specification configurations of the firmware are the same, and when they not match, it is determined that the specification configurations of the firmware are not the same. When the CPU 210 determines that they match, it carries out the processes in the step S605 and the step S606, and when the CPU 210 determines that they do not match, it carries out the process in the step S609.

A description will now be given of a process to determine a method to update firmware according to a second embodiment of the present invention. It should be noted that the same components as those of the first embodiment described above are designated by the same reference symbols, and detailed description thereof is omitted. Only those differing from the first embodiment described above will be described below.

In the first embodiment described above, in the case where an update instruction has been manually issued, such a malfunction that update firmware does not meet a security specification configuration may occur, and hence update of firmware with a different security specification configuration is prohibited across the board.

However, there are cases where, even though security specification configurations will be temporarily changed so as to avoid a malfunction of the device, a user of a device wishes to use update firmware that copes with the multi-function. Also, there may be cases where, when a device is moved to a different office environment, desired security specification configurations may be required to be changed. A description will be given of a method for updating to update firmware with a different security specification configuration only when a user of a device gives permission so as to meet the above requirement.

Figure 6:
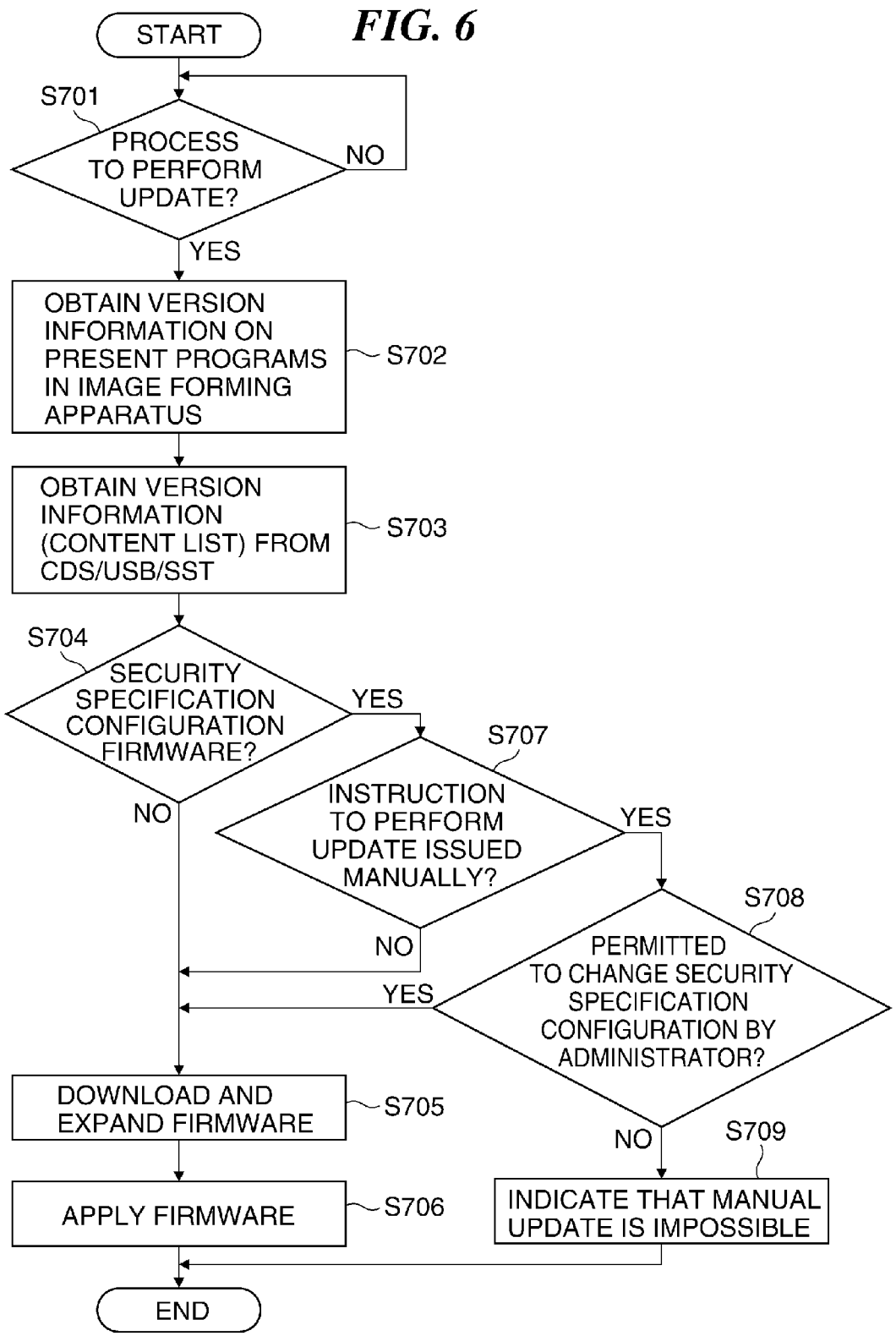
FIG. 6 is a flowchart showing the flow of a process to update firmware according to a second embodiment of the present invention.

FIG. 6 is a flowchart showing the flow of a process to update firmware according to the second embodiment of the present invention. It should be noted that steps other than step S708 in FIG. 6 are the same as the steps other than step S608 in FIG. 5, and description thereof is omitted.

In the step S708, the CPU 210 determines whether or not a change in security specification configurations has been permitted by the administrator, and when the CPU 210 determines that a change in security specification configurations has been permitted by the administrator (YES in the step S708), the process proceeds to step S705. On the other hand, when not (NO in the step S708), the process proceeds to step S709. Whether or not a change in security specification configurations has been permitted by the administrator is determined based on settings configured in advance on, for example, a setting screen displayed on the operating unit 219 in FIG. 7. Only the administrator of the image forming apparatus 100 is allowed to change this setting, and for example, the setting is allowed to be changed only when administrator authentication has been performed.

Figure 7:
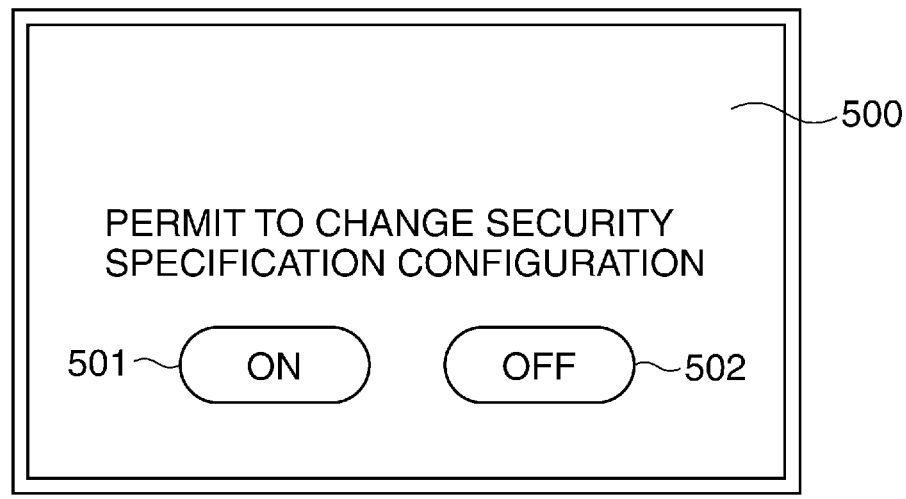
FIG. 7 is a view showing an exemplary setting screen that is displayed on an operating unit and used for an administrator to set a permission to change security specification configurations.

On the setting screen in FIG. 7, the setting as to permission by the administrator to change security specification configurations is configured at OFF in an initial state. When the setting as to permission by the administrator to change security specification configurations is configured at OFF, the determination result in the step S708 is negative (NO), and the process branches to the step S709. On the other hand, when an ON button 501 is depressed, the setting as to permission by the administrator to change security specification configurations is turned ON, and the determination result in the step S708 is positive (YES). The process thus branches to the step S705, in which manual update of firmware is permitted as in the case of general specification configurations. It should be noted that when an OFF button 502 is depressed, the setting as to permission by the administrator to change security specification configurations is turned OFF.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-250096, filed Dec. 3, 2013, which is hereby incorporated by reference herein in its entirety.

What is claimed is:

1. An image forming apparatus comprising:
   a processor; and
   a storage device, the processor configured to execute computer executable instructions recorded on the storage device, the computer executable instructions including instructions, that when executed, cause the image forming apparatus to function as:
   an obtaining unit configured to obtain an instruction of updating firmware in the image forming apparatus; and
   a control unit configured to determine whether the firmware in the image forming apparatus is security firmware, and in a case where the control unit determines that the firmware in the image forming apparatus is security firmware, the control unit then determines whether or not the obtained instruction is caused by a manual input and updates the security firmware in the image forming apparatus upon determining that the obtained instruction is not caused by the manual input,
   wherein in a case where the control unit determines that the firmware in the image forming apparatus is not security firmware, the control unit updates the firmware without determining whether or not the obtained instruction is caused by the manual input.

2. The image forming apparatus as claimed in claim 1, wherein the instruction is obtained based on an operation by a serviceperson.

3. The image forming apparatus as claimed in claim 1, wherein said control unit determines whether or not update firmware which is to be applied in update processing is the security firmware by checking a firmware type described in a content list received in conjunction with the update firmware.

4. The image forming apparatus as claimed in claim 1, wherein said control unit further determines whether or not a type of update firmware which is to be applied in update processing and a firmware type of the firmware in the image forming apparatus are the same.

5. The image forming apparatus as claimed in claim 1, wherein the security firmware includes firmware which is evaluated and authenticated by public certification authorities or firmware which is designed for particular customers who require high security.

6. The image forming apparatus as claimed in claim 1, wherein the computer executable instructions further include instructions that cause the image forming apparatus to function as:
   a warning unit configured to provide a warning regarding the update based on a result of determination by said control unit.

7. The image forming apparatus as claimed in claim 1, wherein said control unit does not update the security firmware in the image forming apparatus under at least one of conditions that said control unit determines that the obtained instruction is caused by the manual input and that it is determined that firmware which is to be applied in update processing is not security firmware.

8. The image forming apparatus as claimed in claim 1, wherein the security firmware is firmware that has been evaluated and verified according to a predetermined security evaluating method.

9. The image forming apparatus as claimed in claim 1, wherein in a case where the control unit determines that the firmware in the image forming apparatus is security firmware, the control unit then determines whether or not the obtained instruction is caused by a manual input and does not update the security firmware in the image forming apparatus upon determining that the obtained instruction is caused by the manual input and determining that firmware which is to be applied in update processing is not security firmware.

10. The image forming apparatus as claimed in claim 9, wherein in a case where the control unit determines that the firmware in the image forming apparatus is security firmware, the control unit then determines whether or not the obtained instruction is caused by a manual input and updates the security firmware in the image forming apparatus upon determining that the obtained instruction is caused by the manual input and determining that firmware which is to be applied in update processing is security firmware.

11. The image forming apparatus as claimed in claim 1, wherein the control unit determines that the obtained instruction is caused by the manual input in a case where the obtained instruction is obtained based on a serviceperson's operation of the image forming apparatus while physically present at the image forming apparatus.

12. A method for controlling an image forming apparatus, comprising:

obtaining an instruction of updating firmware in the image forming apparatus; and determining whether the firmware in the image forming apparatus is security firmware, and in a case where the firmware in the image forming apparatus is determined to be security firmware, then determining whether or not the obtained instruction is caused by a manual input and updating the security firmware in the image forming apparatus upon determining that the obtained instruction is not caused by the manual input, wherein in a case where the firmware in the image forming apparatus is not determined to be security firmware, the firmware is updated without determining whether or not the obtained instruction is caused by the manual input.

13. The method as claimed in claim 12, wherein the security firmware is firmware that has been evaluated and verified according to a predetermined security evaluating method.

* * * * *